United States Patent
Akagunduz et al.

(10) Patent No.: US 11,775,837 B2
(45) Date of Patent: Oct. 3, 2023

(54) FILTER DESIGN FOR SMALL TARGET DETECTION ON INFRARED IMAGERY USING NORMALIZED-CROSS-CORRELATION LAYER IN NEURAL NETWORKS

(71) Applicant: ASELSAN ELEKTRONIK SANAYI VE TICARET ANONIM SIRKETI, Ankara (TR)

(72) Inventors: Erdem Akagunduz, Ankara (TR); Huseyin Seckin Demir, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 518 days.

(21) Appl. No.: 17/046,355

(22) PCT Filed: Apr. 10, 2018

(86) PCT No.: PCT/TR2018/050156
§ 371 (c)(1),
(2) Date: Oct. 9, 2020

(87) PCT Pub. No.: WO2019/199244
PCT Pub. Date: Oct. 17, 2019

(65) Prior Publication Data
US 2021/0150253 A1    May 20, 2021

(51) Int. Cl.
*G06V 10/32*    (2022.01)
*G06V 10/75*    (2022.01)
(Continued)

(52) U.S. Cl.
CPC ......... *G06N 3/084* (2013.01); *G06F 18/2113* (2023.01); *G06N 3/045* (2023.01);
(Continued)

(58) Field of Classification Search
CPC .... G06N 3/084; G06N 3/045; G06F 18/2113; G06V 10/32; G06V 10/751; G06V 10/82; G06V 2201/07
See application file for complete search history.

(56) References Cited

U.S. PATENT DOCUMENTS 5,408,424 A * 4/1995 Lo ................. H03H 21/0012
                                                706/22
2016/0275341 A1* 9/2016 Li ................... G06F 18/24137
(Continued)

OTHER PUBLICATIONS

Wei Zhang et al., Algorithms for optical weak small targets detection and tracking: Review, International Conference on Neural Networks and Signal Processing, 2003, pp. 643-647, vol. 1.
(Continued)

*Primary Examiner* — John W Lee
(74) *Attorney, Agent, or Firm* — Bayramoglu Law Offices LLC

(57) ABSTRACT

A filter design method for a small target detection on infrared imagery using a normalized-cross-correlation layer in neural networks, including the steps of: Normalizing inputs and filters of a convolutional neural network, wherein normalizing inputs and filters of the convolutional neural network provides faster convergence in a limited database. Defining a forward function of a normalization layer in the convolutional neural network, wherein the forward function of the normalization layer in the convolutional neural network is used for training a neural network. Defining a derivative function of the normalization layer for a back propagation in a neural network training phase. Training created neural networks with datasets, wherein the datasets consist of target and background views and using trained neural networks in the small target detection.

4 Claims, 1 Drawing Sheet

(51) Int. Cl.
    G06V 10/82    (2022.01)
    G06N 3/084    (2023.01)
    G06F 18/2113  (2023.01)
    G06N 3/045    (2023.01)
(52) U.S. Cl.
    CPC ............ G06V 10/32 (2022.01); G06V 10/751 (2022.01); G06V 10/82 (2022.01); G06V 2201/07 (2022.01)

(56) References Cited

U.S. PATENT DOCUMENTS

2018/0075347 A1*  3/2018  Alistarh ................ G06N 3/084
2018/0129906 A1*  5/2018  Habibian ............. G06V 10/764

OTHER PUBLICATIONS

Xiangzhi Bai, et al., Survey on dim small target detection in clutter background: Wavelet, inter-frame and filter based algorithms, Procedia Engineering, 2011, pp. 479-483, vol. 15.

Andrea Sanna et al., Advances in Target Detection and Tracking in Forward-Looking Infrared (FLIR) Imagery, Sensors, 2014, p. 20297-20303, vol. 14.

Arulkumar Subramaniam, et al., NNC-Net: Normalized Cross Correlation Based Deep Matcher with Robustness to Illumination Variations, 2018 IEEE Winter Conference on Applications of Compturer Vision, 2018, pp. 1944-1953.

John Barnett, Statistical analysis of median subtraction filtering with application to point target detection in infrared backgrounds, Infrared Systems and Components III, 1989, pp. 10-15, vol. 1050.

Victor T. Tom, et al., Morphology-based algorithm for point target detection in infrared backgrounds, 1993, pp. 2-11, vol. 1954, SPIE.

Suyog D. Deshpande, et al., Max-mean and max-median filters for detection of small targets, 1999, pp. 74-83.

R. Nitzberg, et al., Spatial filtering techniques for infrared (IR) sensors, Smart Sensors, 1979, pp. 40-58 vol. 178, SPIE.

William A. C. Schmidt, Modified matched filter for cloud clutter suppression, IEEE Trans. Pattern Anal. Mach. Intell., Jun. 1990, pp. 594-600, vol. 12, No. 6.

Peizhi Wen, et al., A method for automatic infrared point target detection in a sea background based on morphology and wavelet transform, 2003, pp. 248-253, vol. 5286, SPIE.

Dennis J. Gregoris, et al., Detection of dim targets in flir imagery using multiscale transforms, Infrared Technology XX, 1994, pp. 62-71, vol. 2269, SPIE.

Guoyou Wang, et al., Efficient method for multi-scale small target detection from a natural scene, Optical Engineering, 1996, pp. 761-768, vol. 35, No. 3.

Zhicheng Wang, et al., Small infrared target fusion detection based on support vector machines in the wavelet domain, Optical Engineering, 2006, 076401-1-9, vol. 45, No. 7.

Sungho Kim, et al., Scale invariant small target detection by optimizing signal-to-clutter ratio in heterogeneous background for infrared search and track, Pattern Recognition, 2012, pp. 393-406, vol. 45 No. 1.

Yantao Wei, et al., Multiscale patch-based contrast measure for small infrared target detection, Pattern Recognition, 2016, pp. 216-226, vol. 58.

He Deng, et al., Entropy-based window selection for detecting dim and small infrared targets, Pattern Recognition, 2017, pp. 66-77, vol. 61.

Shengxiang Qi, et al., A fast-saliency method for real-time infrared small target detection, Infrared Physics & Technology, 2016, pp. 440-450, vol. 77.

Mohammad S. Alam, et al., Trends in correlation-based pattern recognition and tracking in forward looking infrared imagery, Sensors, 2014, p. 13437-13475, vol. 14, No. 8.

Erhan Gundogdu, et al., Comparison of infrared and visible imagery for object tracking: Toward trackers with superior IR performance, IEEE Conference on Computer Vision and Pattern Recognition Workshops, 2015, pp. 1-9.

Ling Shao, et al., An overview and performance evaluation of classification-based least squares trained filters, IEEE Transactions on Image Processing, 2008, pp. 1772-1782, vol. 17, No. 10.

Erhan Gundogdu et al., Good Features to Correlate for Visual Tracking, IEEE Transactions on Image Processing, 2018, pp. 2526-2540, vol. 27 No. 5.

Jack Valmadre, et al., End-to-end representation learning for correlation filter based tracking, IEEE Conference on Computer Vision and Pattern Recognition, 2017, pp. 5000-5008.

Raman Arora, et al., Understanding Deep Neural Networks With Rectified Linear Units, Published as a conference paper at ICLR, 2018, pp. 1-17.

Andrea Vedaldi et al., MatConvNet—Convolutional Neural Networks for MATLAB, Proceeding of the ACM Int. Conf. on Multimedia, 2015, pp. 1-55.

Yangqing Jia, et al., Caffe: Convolutional Architecture for Fast Feature Embedding, 2014.

Wanting Wang, et al., Small target detection in infrared image using convolutional neural networks, Proc. of SPIE, pp. 1046250-1-1046250-6, vol. 10462 No. 2.

Wei Yang, Initialization and Normalization in Deep Neural Networks, Notes for ELEG5491 Introduction to Deep Learning, 2017, pp. 1-8.

Anonymous, How to normalize filters in convolutional neural networks?, 2017.

* cited by examiner

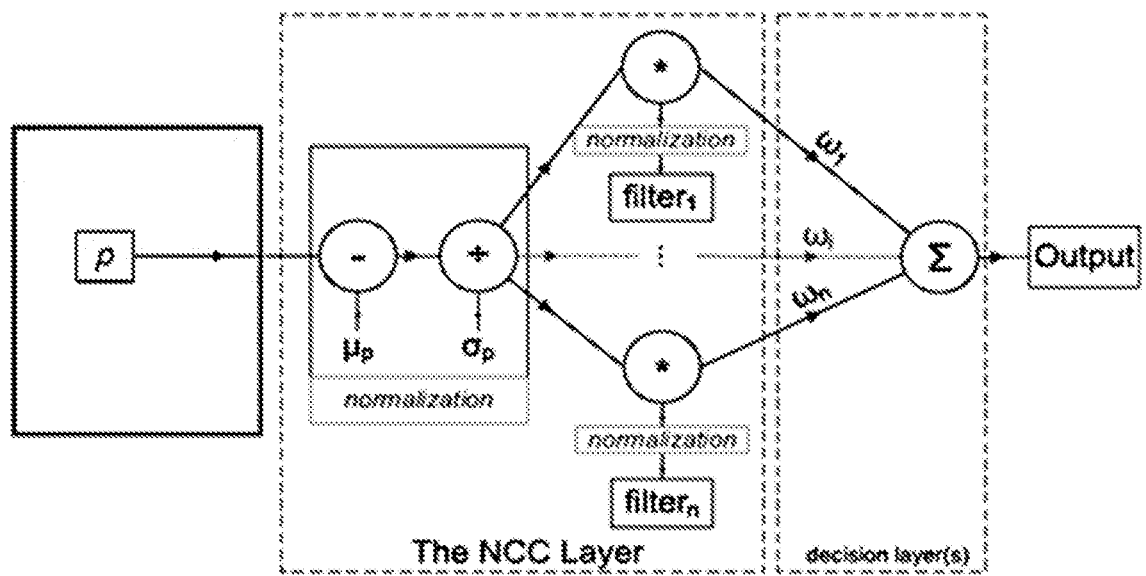

FILTER DESIGN FOR SMALL TARGET DETECTION ON INFRARED IMAGERY USING NORMALIZED-CROSS-CORRELATION LAYER IN NEURAL NETWORKS

CROSS REFERENCE TO THE RELATED APPLICATION

This application is the national stage entry of International Application No. PCT/TR2018/050156, filed on Apr. 10, 2018, the entire contents of which are incorporated herein by reference.

TECHNICAL FIELD

The invention introducing a machine learning approach to the problem of infrared small target detection/recognition filter design. For this purpose, similarly to a convolutional layer of a neural network, the normalized-cross-correlational (NCC) layer, which is utilized for designing a target detection/recognition filter bank, is proposed. By utilizing the NCC layer in a neural network structure, we introduce a framework, in which supervised training is used to calculate the optimal filter shape and the optimum number of filters required for a specific target detection/recognition task on infrared images.

We also propose the MAD-NCC, an efficient implementation of NCC layer, designed especially for the FPGA systems, in which square root operations are avoided for real-time computation. As a case study, we work on dim-target detection on mid-wave infrared imagery and obtain the filters that can discriminate a dim target from various types of background clutter, specific to our operational concept.

BACKGROUND

Small target detection on infrared (IR) imagery is one of the basic, yet challenging problems of infrared vision. Depending on the detection range, target size, clutter level, operational success requirements, computational power availability and power constraints, several solutions [1], [2], [3] have been proposed for various systems, such as infrared search-and-track (IRST), forward-looking infrared (FLIR), missile seeker heads, just to name a few. Although there are countless approaches to the problem, an efficient, widely-accepted and off-the-shelf solution still does not exist for small target detection or recognition problem on infrared imagery.

Conventional solutions on small target detection on IR imagery [4], [5], [6], [7], [8], [9], [10] aim at reducing the background clutter by proposing different filter types in a heuristic manner, such as mean, median, top-hat, Gaussian etc. Although these filters show some success to reduce the clutter, they are not inherently designed to detect a specific type of target. Or they don't have the ability to differentiate a target from a false target, which is usually not clutter, but a different object in the scene, like a bird or a bad pixel. Multi-scale approaches [11], [12], [13], [14], [15] to the problem provide scale-invariance; thus they are robust to target size change. However, neither the multi-scale approaches nor some recent entropy [16] or saliency-based [17] methods promise sufficient performance against false targets or target-like clutter.

Using correlation filters to detect small or extended targets in a signal is a well-studied approach [18]. Especially for different infrared imaging sub-bands such as mid-wave (MW) or long-wave (LW) infrared, normalized-cross-correlation (NCC) is proven to be an effective template matching method [19]. However, the problem with the NCC-based matching is the ambiguity in filter selection or design. To solve this problem, the idea of supervised filter training is introduced in which the required filter is designed using a dataset [20]. Especially to solve the tracking problem where the target-clutter relation constantly varies, learning-based approaches are highly effective [21], [22].

Convolutional neural networks (CNN) are the state-of-the-art de-facto standard of any machine learning approach. And there are many recent studies that focus on using deep CNNs to detect and recognize various types of objects or targets. The main reason we choose to use the proposed NCC layer, instead of convolutional layers, is that NCC layer needs relatively less data to converge. For many operational concepts, such as detection in seeker head systems, the amount of available training data is not sufficient to prevent a deep CNN from overfitting. We discuss the benefits of using the NCC layer instead of the conventional convolutional layer in the following sections.

SUMMARY

With this invention, we introduce a learning-based approach to small target detection filter design problem on infrared imagery. To this end, we propose the normalized-cross-correlational layer, a variation of convolutional layers of a neural network. Utilizing the NCC layer, we introduce a framework, in which supervised training is used to compute a filter bank, i.e. the optimal filters and the optimum number of filters required for a specific detection/recognition task. By feeding the proposed normalized-cross-correlational neural network (NCC-NN) structure with positive samples, such as different snapshots of the target, and negative samples, such as different types of clutter that create false alarms, a filter bank is obtained as a complete layer of the trained neural network. This way, not only the detection success is maximized but the filters that create the minimum false alarm rates are obtained, simultaneously.

We also propose the mean-absolute-deviation NCC (MAD-NCC) layer, an efficient implementation of NCC layer, designed especially for the FPGA systems. In this optimized design, square root operations are avoided for real-time computation and minimal resource use. As a case study, we work on dim-target detection on mid-wave infrared imagery and benchmark the performance of different filter designs. The results of the trained NCC-NN shows that instead of choosing heuristic filter designs, it is possible to converge to a filter set that would come up with an improved receiver operating characteristics.

One of the main reason why a normalization is not conventionally preferred for a CNN layer is the fact that bounding the output range may limit, or even diminish forward propagation. What a Re-Lu layer does in a CNN is [23] to destroy negative, and proportionally admit positive, forward propagation. Limiting both the negative and positive output of the convolutional node, like it happens for the proposed NCC layer, is similar to using a poor activation function and will result in a poor performance for CNNs. Despite this seemingly undesired fact, we have two main motivations in utilizing the NCC layer. Firstly, the main reason why NCC is a good template matching method for infrared imagery is the fact that, the low signal frequencies (like the average image intensity) are eliminated in normalization. In infrared imagery, this is a desired fact, because depending on the dynamic range of an infrared detector, the low frequencies of an infrared image is expected to differ among different systems that use the same infrared subband. Theoretically, a CNN is capable of discriminating these low-band signal properties. However the performance of CNNs, especially deep CNNs, depend on the availability of data. In practical situations, such data are not usually available. CNN-based methods easily overfit, for example, to mean intensity values of a scene (which may depend on the air temperature), when the collected samples are limited. What is more, a detection or recognition capable neural network, trained with a specific dataset, is occasionally applied to perform for another infrared sub-band or another detector, in which low frequency elements like the mean intensity are expected to differ, as well. Thus, the NCC layer, when infrared detection and recognition tasks are considered, has more generalization power compared to a convolutional layer and is more likely to converge to optimum weights (i.e. filter shape) with relatively limited data.

Secondly, utilizing the NCC layer structure, compatible with a general neural networks architecture is quite beneficial considering the fact that it can easily be trained using back-propagation. This way we can extract the NCC layer as a filter bank and directly utilize it for an operational purpose (detection, recognition, etc.) In order to better experiment the proposed concept, in the following sections we provide a custom NCC layer structure, which can be easily combined with any of the multi-layered deep learning software libraries.

To realize aforementioned purposes, the invention is a filter design method for small target detection on infrared imagery using normalized-cross-correlation layer in neural networks, characterized by comprising steps of;

Normalizing input patches and filter coefficients of convolutional neural network layers for providing faster convergence in limited database,
Defining forward propagation function of normalization layer in convolutional neural network,
Defining derivative function of normalization layer for back propagation which is used in the neural network training phase,
Training the created neural networks by employing back propagation method and using datasets which consist of target and background views,
Using the trained neural networks in small target detection task.

BRIEF DESCRIPTION OF THE DRAWINGS

FIGURE, A sample two-layer NCC-NN structure, with an NCC layer and a simple fully connected decision layer, is depicted. NCC layer is similar to a convolutional layer, with the exception that the patch is normalized prior to being convolved with the filters.

DETAILED DESCRIPTION OF THE EMBODIMENTS

The detailed description is organized as follows: the next section introduces the proposed neural network layers, the normalized cross correlation (NCC) layer and its optimized form the mean-absolute-deviation-NCC (MAD-NCC) layer. Normalized-Cross-Correlation (NCC) Layer for Neural Networks (NNs)

In this section we introduce the normalized-cross-correlational layer, which is an alternative to convolutional layers in neural networks. In addition, explicit formulation of forward and backward propagation functions for the proposed structure are provided.

The NCC Layer

The NCC layer is a variation of a convolutional layer of a neural network, with the exception that the input is normalized prior to being convolved with the filters (or kernels) of that layer. A simple structure of the NCC layer is given in FIGURE. As can be seen from the FIGURE, if the normalization block is removed, the NCC layer becomes identical to a convolutional layer. The outcome of normalizing the input before convolving it with a filter is simply limiting the output values. When both the filter and the input is normalized, the convolution operation becomes identical to normalized-cross-correlation[a] and the output is bounded in the range [−1,1]. The output of NCC between two 2D discrete signals A(i,j) and B(i,j), defined as $p^{2D}_{A;B}$ in Equation 1, is a measure of linear dependence between A and B, with +1 showing complete positive dependence, −1 showing complete negative dependence and 0 showing independence.

$$p \circledast f = \frac{1}{(n-1)} \cdot \sum_i \frac{(p(i) - \mu_p) \cdot (f(i) - \mu_f)}{\sigma_p \cdot \sigma_f} \tag{1}$$

([a] Either the filter or the signal must be real-valued and symmetric for this generalization to hold, which is a general case when CNNs are considered. The pixel values are always real valued and so our filter values. How to constrain the filter to symmetric shape or its (un)necessity for our application of the NCC layer is discussed in the following sections)

In Equation 1, $\circledast$ symbol represents the normalized-cross correlation operation, n is the total number of pixels[b] in p or f, $\mu_p$ and $\mu_f$ are the average pixel values and $\sigma_p$ and $\sigma_f$ are the standard deviations of the pixels of p and f, respectively.

([b]Although p is a 2D real-valued signal, an image patch, the notation p(i) is preferred instead of p(i,j) for the sake of simplicity. The variable i represents a total n pixels in both horizontal and vertical dimensions of the patch p.)

NCC Layer Implementation

A NCC node, as given in FIGURE, is a serial combination of a normalization node and a convolutional node. Equation 1 is an explicit formulation of the forward operation of this layer. However, in this chapter we will obtain the forward and backward propagation formulas for this layer by considering the normalization and convolution as two separate sequential operations. The reason we chose to separate these two formulas is practical. Extremely fast GPU-based solutions exist for forward and backward convolution operations in CNNs. Thus, instead of constructing the function for this new layer from scratch, it is practically much more convenient to detach two operations, derive functions for normalization only, append these functions to a convolutional layer of an existing CNN library (such as MatConvNet [24]) and experiment on a desired set of data. Below in Equation 2, an equivalent formulation of the NCC forward function is provided.

$$x\text{corr}(p) = \bar{p} * \bar{f} \tag{2}$$

The forward function of the NCC is simply the convolution of the normalized 2D discrete input signal $\bar{p}$ with the layer coefficients (filter) $\bar{f}$. The normalized signal $\bar{p}$ can be calculated as:

$$\overline{p} = \frac{1}{\sqrt{n-1}} \cdot \frac{p - \mu_p}{\sigma_p} \quad (3)$$

In Equation 3, $\mu_p$ represents the mean pixel value and $\sigma_p$ represents the standard deviation of the patch p. Below we also provide the well-known formulas of mean and standard deviation calculation, because we will need to derive their derivatives for backward function calculation in the following steps. Using Equations 2 and 3, we obtain the same forward operation that was given in Equation 1, but in an alternative form where normalization is nested within the convolution/correlation operation.

$$\mu_p = \sum_{i=1}^{N} p(i), \quad \sigma_p = \sqrt{\frac{1}{(n-1)} \sum_{i=1}^{N} (p(i) - \mu_p)^2} \quad (4)$$

In order to obtain the backward propagation functions of a node in a neural network, we find the partial derivatives of the output with respect to input patch and the filter values (weights) of that node. In our case, the forward function is a normalization function nested within convolution. In order to obtain the back propagation function, We simply apply the chain rule and get:

$$\frac{\partial O}{\partial p} = \frac{\partial O}{\partial \overline{p}} \cdot \frac{\partial \overline{p}}{\partial p} \quad (5)$$

$$\frac{\partial O}{\partial f} = \frac{\partial O}{\partial \overline{f_k}} \cdot \frac{\partial \overline{f_k}}{\partial f_k} \quad (6)$$

In Equations 5 and 6, O represents the scalar output of an NCC node, p represents the input patch and $f_k$ represents the $k^{th}$ filter in that layer. Equations are identical since both the input and the filter are normalized and the convolution operation is commutative. $\partial O / \partial \overline{p}$ stands for the partial derivation of convolution operation, whereas $\partial \overline{p}/\partial p$ stands for the derivative of normalization operation (3) for back propagation, which is given below in Equation 7.

$$\frac{\partial \overline{p}}{\partial p} = \frac{1}{\sqrt{n-1} \cdot \sigma_p} \cdot \left(I - \frac{1}{n}\right) \cdot \left(I - \frac{(p - \mu_p)(p - \mu_p)^T}{(p - \mu_p)^T(p - \mu_p)}\right) \quad (7)$$

As mentioned above, by using Equations 3 and 7, we implemented the NCC layer within MatConvNet library [24] by appending the forward and backward functions for normalization to a custom layer, which also uses the hardware-based (both forward and backward) convolution functions of this library. By using any other open source deep net library (such as Caffe [25], etc.), NCC layer can be identically implemented.

MAD-NCC Layer Implementation

The MAD-NCC layer is an efficient implementation of NCC layer, in which mean-absolute-deviation (MAD) operation is used instead of standard deviation. Thus, for the MAD-NCC layer implementation, the input patch p is normalized by using the equation below:

$$\overline{p} = \frac{1}{\sqrt{n}} \cdot \frac{p - \mu_p}{mad_p} \quad (8)$$

In 8, $mad_p$ stands for the mean-absolute-deviation of image patch and is calculated as:

$$mad_p = \frac{1}{n} \sum_{i=1}^{N} |p(i) - \mu_p| \quad (9)$$

Consequently, the backward function $\partial O/\partial \overline{p}$ for MAD-normalization can be derived as:

$$\frac{\partial \overline{p}}{\partial p} = \frac{1}{\sqrt{n} \cdot mad_p} \cdot \left(I - \frac{1}{n}\right) \cdot \left(I - \frac{(p - \mu_p) \cdot \mathrm{sign}(p - \mu_p)^T}{n \cdot mad_p}\right) \quad (10)$$

In Equation 10, sign(.) is the signum function. Similarly to the NCC layer, by using 8 and 10, we implemented the MAD-NCC layer within MatConvNet library [24] by appending the mad-normalization (forward and backward) functions into a custom layer and again by using the built-in hardware-based convolution functions of this library.

Our motivation behind designing the MAD-NCC layer is basically to avoid vector-based square-root operations that exist in standard deviation calculation. This way, we expect to have a faster forward operation, with a slightly degraded performance.

REFERENCES

[1] W. Zhang, M. Cong, and L. Wang, "Algorithms for optical weak small targets detection and tracking: Review," International Conference on Neural Networks and Signal Processing, 2003. Proceedings of the 2003, vol. 1, pp. 643-647, 2003.

[2] X. Bai, S. Zhang, B. Du, Z. Liu, T. Jin, B. Xue, and F. Zhou, "Survey on dim small target detection in clutter background: Wavelet, inter-frame and filter based algorithms," Procedia Engineering, vol. 15, no. Supplement C, pp. 479-483, 2011.

[3] A. Sanna and F. Lamberti, "Advances in target detection and tracking in forward-looking infrared (flir) imagery." Sensors (Basel, Switzerland, vol. 14, no. 11, p. 2029720303, 2014.

[4] R. C. Warren, "Detection of distant airborne targets in cluttered back-grounds in infrared image sequences," Ph.D. dissertation, Engineering University of South Australia, 2002.

[5] J. Barnett, "Statistical analysis of median subtraction filtering with application to point target detection in infrared backgrounds," pp. 10-15, 1989.

[6] V. T. Tom, T. Peli, M. Leung, and J. E. Bondaryk, "Morphology-based algorithm for point target detection in infrared backgrounds," pp. 2-11, 1993.

[7] S. D. Deshpande, M. H. Er, R. Venkateswarlu, and P. Chan, "Max-mean and max-median filters for detection of small targets," pp. 74-83.

[8] R. Nitzberg, D. F. E. H. Takken, and A. F. Milton, "Spatial filtering techniques for infrared (ir) sensors," pp. 40-58, 1979.

[9] W. Schmidt, "Modified matched filter for cloud clutter suppression," IEEE Trans. Pattern Anal. Mach. Intell., vol. 12, no. 6, pp. 594-600, June 1990.

[10] P. Wen, Z. Shi, H. Yu, and X. Wu, "A method for automatic infrared point target detection in a sea background based on morphology and wavelet transform," pp. 248-253, 2003.

[11] D. J. Gregoris, S. K. Yu, S. Tritchew, and L. Sevigny, "Detection of dim targets in flir imagery using multiscale transforms," pp. 62-71, 1994.

[12] G. Wang, T. Zhang, L. Wei, and N. Sang, "Efficient method for multi-scale small target detection from a natural scene," Optical Engineering, vol. 35, no. 3, pp. 761-768, 1997.

[13] Z. Wang, J. Tian, J. Liu, and S. Zheng, "Small infrared target fusion detection based on support vector machines in the wavelet domain," Optical Engineering, vol. 45, no. 7, 2006.

[14] S. Kim and J. Lee, "Scale invariant small target detection by optimizing signal-to-clutter ratio in heterogeneous background for infrared search and track," Pattern Recognition, vol. 45, no. 1, pp. 393-406, 2012.

[15] Y. Wei, X. You, and H. Li, "Multiscale patch-based contrast measure for small infrared target detection," Pattern Recognition, vol. 58, no. Supplement C, pp. 216-226, 2016.

[16] H. Deng, X. Sun, M. Liu, C. Ye, and X. Zhou, "Entropy-based window selection for detecting dim and small infrared targets," Pattern Recognition, vol. 61, no. Supplement C, pp. 66-77, 2017.

[17] S. Qi, G. Xu, Z. Mou, D. Huang, and X. Zheng, "A fast-saliency method for real-time infrared small target detection," Infrared Physics & Technology, vol. 77, no. Supplement C, pp. 440-450, 2016.

[18] M. S. Alam and S. M. A. Bhuiyan, "Trends in correlation-based pattern recognition and tracking in forward-looking infrared imagery," Sensors (Basel, Switzerland), vol. 14, no. 8, p. 1343713475, 2014.

[19] E. Gundogdu, H. Ozkan, H. S. Demir, H. Ergezer, E. Akagunduz, and S. K. Pakin, "Comparison of infrared and visible imagery for object tracking: Toward trackers with superior IR performance," in 2015 IEEE Conference on Computer Vision and Pattern Recognition Workshops, 2015, pp. 1-9.

[20] L. Shao, H. Zhang, and G. de Haan, "An overview and performance evaluation of classification-based least squares trained filters," IEEE Transactions on Image Processing, vol. 17, no. 10, pp. 1772-1782, 2008.

[21] E. Gundogdu and A. A. Alatan, "Good features to correlate for visual tracking," CoRR, vol. abs/1704.06326, 2017. [Online]. Available: http://arxiv.org/abs/1704.06326

[22] J. Valmadre, L. Bertinetto, J. F. Henriques, A. Vedaldi, and P. H. Torr, "End-to-end representation learning for correlation filter based tracking," in 2017 IEEE Conference on Computer Vision and Pattern Recognition, 2017.

[23] R. Arora, A. Basu, P. Mianjy, and A. Mukherjee, "Understanding deep neural networks with rectified linear units," CoRR, vol. abs/1611.01491, 2016. [Online]. Available: http://arxiv.org/abs/1611.01491

[24] A. Vedaldi and K. Lenc, "Matconvnet—convolutional neural networks for matlab," in Proceeding of the ACM Int. Conf. on Multimedia, 2015.

[25] Y. Jia, E. Shelhamer, J. Donahue, S. Karayev, J. Long, R. Girshick, S. Guadarrama, and T. Darrell, "Caffe: Convolutional architecture for fast feature embedding," arXiv preprint arXiv:1408.5093, 2014.

What is claimed is:

1. A filter design method for a small target detection on an infrared imagery using a normalized-cross-correlation layer in neural networks, comprising steps of:
normalizing input patches and filter coefficients of convolutional neural network layers for providing a faster convergence in a limited database,
defining a forward propagation function of a normalization layer in a convolutional neural network,
defining a derivative function of the normalization layer for a back propagation, wherein the back propagation is used in a neural network training phase,
training a created neural network by employing a back propagation method and using datasets, wherein the datasets consist of target and background views, and
using trained neural networks in a small target detection task, wherein a forward function of the normalized-cross-correlation layer is a convolution of a normalized 2D discrete input signal $\bar{p}$ and layer coefficients filter $\bar{f}$, and wherein the normalized 2D discrete input signal $\bar{p}$ is calculated by the following formula:

$$\bar{p} = \frac{1}{\sqrt{n-1}} \cdot \frac{p - \mu_p}{\sigma_p}$$

where $\mu_p$ represents a mean pixel value and $\sigma_p$ represents a standard deviation of a patch p.

2. The filter design method according to claim 1, wherein $\mu_p$ and $\sigma_p$ are calculated by the following formula:

$$\mu_p = \sum_{i=1}^{N} p(i), \; \sigma_p = \sqrt{\frac{1}{(n-1)} \sum_{i=1}^{N} (p(i) - \mu_p)^2}$$

where n is a total number of pixels.

3. The filter design method according to claim 1, wherein a derivative of the normalization layer for the back propagation is defined by the following formula:

$$\frac{\partial \bar{p}}{\partial p} = \frac{1}{\sqrt{n-1} \cdot \sigma_p} \cdot \left(I - \frac{1}{n}\right) \cdot \left(I - \frac{(p - \mu_p)(p - \mu_p)^T}{(p - \mu_p)^T (p - \mu_p)}\right).$$

4. The filter design method according to claim 1, wherein a mean absolute deviation (MAD) is used instead of a standard deviation for an effective normalization layer.

* * * * *